US008892960B2

(12) United States Patent
Sambamurthy et al.

(10) Patent No.: US 8,892,960 B2
(45) Date of Patent: Nov. 18, 2014

(54) SYSTEM AND METHOD FOR DETERMINING CAUSES OF PERFORMANCE PROBLEMS WITHIN MIDDLEWARE SYSTEMS

(75) Inventors: Govinda Raj Sambamurthy, Bangalore (IN); Raji Sankar, Bangalore (IN); Rahul Goyal, Bangalore (IN); Ashwin Kumar Karkala, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 512 days.

(21) Appl. No.: 13/009,775

(22) Filed: Jan. 19, 2011

(65) Prior Publication Data

US 2012/0185735 A1 Jul. 19, 2012

(51) Int. Cl.
G06F 11/00 (2006.01)
G06F 11/07 (2006.01)
G06F 11/34 (2006.01)

(52) U.S. Cl.
CPC .......... *G06F 11/079* (2013.01); *G06F 11/3452* (2013.01); *G06F 11/3409* (2013.01)
USPC ....................................................... 714/47.3

(58) Field of Classification Search
CPC ............ G06F 11/3409; G06F 11/3452; G06F 11/079; G06F 11/0793
See application file for complete search history.

(56) References Cited

U.S. PATENT DOCUMENTS

| | | | |
|---|---|---|---|
| 4,166,290 A * | 8/1979 | Furtman et al. ............... | 714/47.3 |
| 5,222,065 A | 6/1993 | Krogmann | |
| 5,257,358 A | 10/1993 | Cohen | |
| 5,958,009 A | 9/1999 | Friedrich et al. | |
| 6,018,300 A | 1/2000 | Dowden et al. | |
| 6,049,666 A | 4/2000 | Bennett et al. | |
| 6,549,521 B1 | 4/2003 | Edwards et al. | |
| 6,792,460 B2 * | 9/2004 | Oulu et al. .................... | 709/224 |
| 6,954,779 B2 * | 10/2005 | Duggan et al. ................ | 709/203 |
| 7,020,802 B2 * | 3/2006 | Gross et al. .................... | 714/39 |
| 7,237,023 B2 * | 6/2007 | Menard et al. ................ | 709/224 |
| 7,254,750 B1 * | 8/2007 | Okun et al. .................... | 714/47.2 |
| 7,424,530 B2 | 9/2008 | Chagoly et al. | |
| 7,493,234 B2 * | 2/2009 | Greco et al. ................... | 702/182 |
| 7,962,437 B2 * | 6/2011 | Brandenburg et al. ......... | 706/48 |
| 8,205,116 B2 * | 6/2012 | Yang et al. ..................... | 714/26 |
| 8,219,997 B2 | 7/2012 | Shimizu et al. | |
| 8,375,251 B2 * | 2/2013 | Ness et al. ...................... | 714/26 |
| 8,458,530 B2 * | 6/2013 | Kini et al. ..................... | 714/47.1 |
| 8,631,280 B2 * | 1/2014 | Sankar et al. ............... | 714/38.12 |
| 8,832,839 B2 * | 9/2014 | Avritzer ......................... | 726/25 |
| 2001/0034663 A1 | 10/2001 | Teveler et al. | |
| 2005/0172306 A1 | 8/2005 | Agarwal et al. | |
| 2005/0216781 A1 * | 9/2005 | Doshi et al. ........................ | 714/2 |
| 2007/0168915 A1 * | 7/2007 | Fabbio et al. ................. | 717/101 |

(Continued)

*Primary Examiner* — Michael Maskulinski
(74) *Attorney, Agent, or Firm* — Meyer IP Law Group

(57) ABSTRACT

A method of determining a root cause of a performance problem is provided. The method comprises analyzing a plurality of performance indicators/metrics in a first time period and determining that at least one performance indicators/metric is exhibiting abnormal behavior. The method further comprises analyzing the plurality of performance indicators/metrics over a second time period, the second time period is longer than the first time period, and determining trend information for each performance indicators/metric over the second time period. The method further comprises correlating the trend information for each performance indicators/metric with performance problem information stored in a knowledge base, identifying a potential cause of the abnormal behavior based on the correlation, and alerting a user of the potential cause.

20 Claims, 6 Drawing Sheets

(56) References Cited

U.S. PATENT DOCUMENTS

| | | |
|---|---|---|
| 2010/0169713 A1 | 7/2010 | Argue et al. |
| 2011/0145651 A1 | 6/2011 | Molnar et al. |
| 2011/0161048 A1* | 6/2011 | Sodem et al. .............. 702/181 |
| 2012/0216205 A1 | 8/2012 | Bell et al. |
| 2012/0284719 A1 | 11/2012 | Phan et al. |
| 2012/0304182 A1 | 11/2012 | Cho et al. |

* cited by examiner

SYSTEM AND METHOD FOR DETERMINING CAUSES OF PERFORMANCE PROBLEMS WITHIN MIDDLEWARE SYSTEMS

CROSS REFERENCE TO RELATED APPLICATIONS

This application is related to the following U.S. patent applications, each of which is incorporated by reference herein in its entirety:

U.S. patent application Ser. No. 13/009,788 entitled "SYSTEM AND METHOD FOR USING DEPENDENCY IN A DYNAMIC MODEL TO RELATE PERFORMANCE PROBLEMS IN A COMPLEX MIDDLEWARE ENVIRONMENT", by Govinda Raj Sambamurthy et al., filed on Jan. 19, 2011;

U.S. patent application Ser. No. 13/009,777 entitled "METHOD OF MEASURING AND DIAGNOSING MISBEHAVIORS OF SOFTWARE COMPONENTS AND RESOURCES", by Raji Sankar et al., filed on Jan. 19, 2011;

U.S. patent application Ser. No. 13/009,781 entitled "EFFICIENT DATA COLLECTION MECHANISM IN A MIDDLEWARE RUNTIME ENVIRONMENT", by Raji Sankar et al., filed on Jan. 19, 2011; and U.S. patent application Ser. No. 13/009,800 entitled "SYSTEM AND METHOD FOR PROVIDING A STATIC MODEL MAP OF BEHAVIORS IN A MIDDLEWARE SYSTEM, FOR USE IN IDENTIFYING SYSTEM PROBLEMS" by Raji Sankar et al., filed on Jan. 19, 2011.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The invention is generally related to diagnosing performance problems in middleware systems, and particularly to a system and method for determining causes of performance problems within middleware systems.

BACKGROUND

An application server environment can present complex monitoring challenges including identifying possible occurrences of performance problems and knowing the appropriate parameter or parameters to modify to improve performance. Such monitoring typically relies heavily on the administrator having a complete knowledge of all of the components in the entire topology, as well as the vast amount of information collected for each runtime environment, and the relationships between the various components to be able, to confidently identify and fix problems.

However, current approaches for diagnosing performance problems within an application server, cannot be standardized and automated across various containers within the server, and are of little use in determining a root cause of a problem. These are the general areas that embodiments of the invention are intended to address.

SUMMARY

In accordance with an embodiment, a method of determining a root cause of a performance problem is provided. The method comprises analyzing a plurality of performance indicators/metrics in a first time period and determining that at least one performance indicator/metric is exhibiting abnormal behavior. The method further comprises analyzing the plurality of performance indicators/metrics over a second time period, the second time period is longer than the first time period, and determining trend information for each performance indicators/metrics over the second time period. The method further comprises correlating the trend information for each performance indicator/metric with performance problem information stored in a knowledge base, identifying a potential cause of the abnormal behavior based on the correlation, and alerting a user of the potential cause.

DETAILED DESCRIPTION

Figure 1:
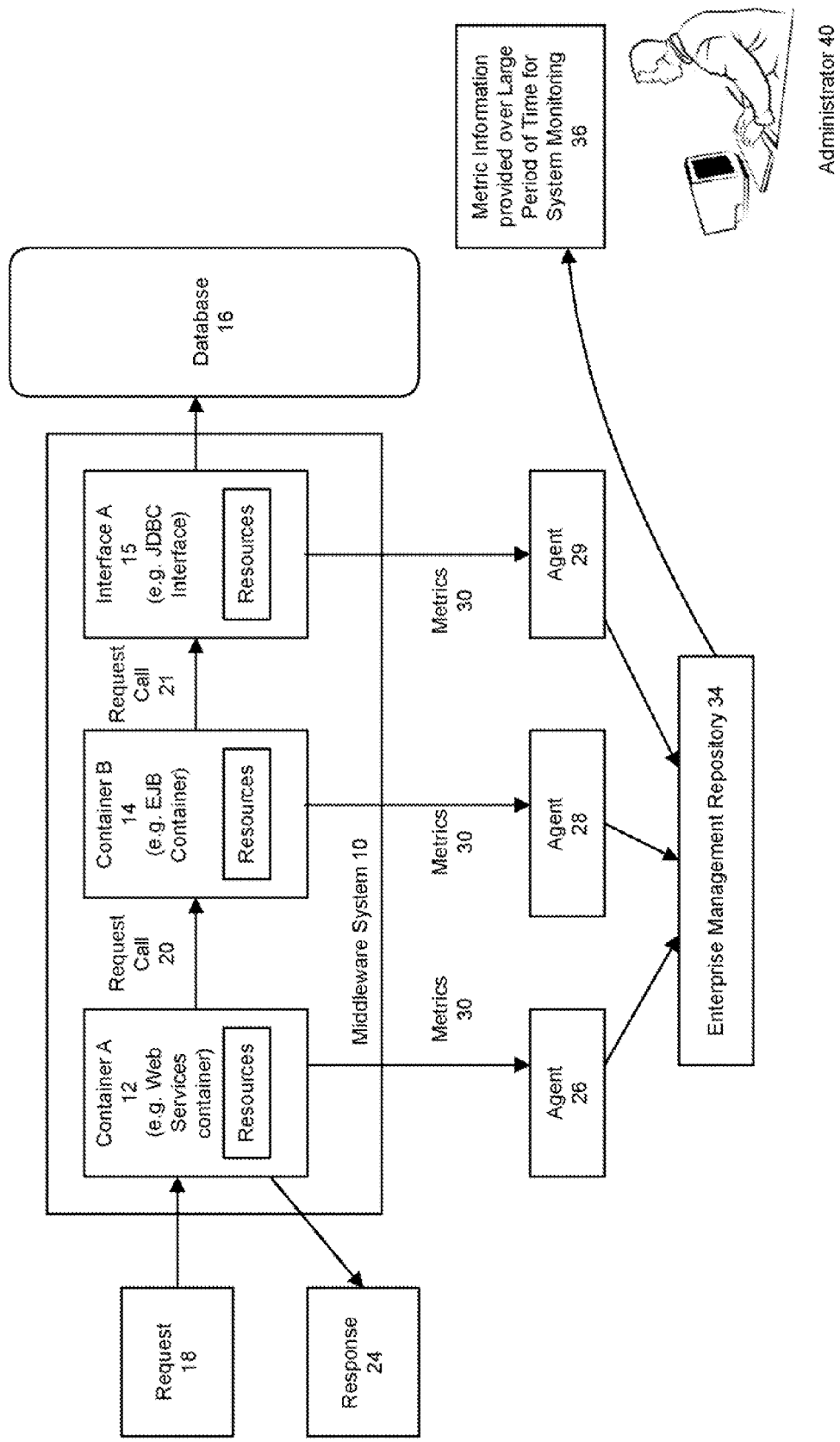
FIG. 1 illustrates a system, such as a middleware system, in accordance with an embodiment.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments, the methods and techniques for measuring and diagnosing software misbehavior can be implemented in a software middleware system, such as an application server. Other types of middleware systems can also be utilized in conjunction with the various embodiments described herein, such as web servers, business process management (BPM) and process execution systems, enterprise service buses, service access gateways, messaging brokers and messaging systems, and the like.

DEFINITIONS

In accordance with an embodiment, as used herein, the term "efficiency" is used to refer to a computation with no units, and normalized against load. It is defined as the ratio of the number of requests in this sampling period that completed execution within the sampling period to the total number of requests that came in for processing in this sampling period. Though it is normalized against load, it will vary with load if load affected the behavior of the component and stay constant if not.

In accordance with an embodiment, as used herein, the term "inefficiency" is used to refer to the inverse of efficiency. It is defined as the ratio of the number of requests in this sampling period that is still executing at the end of this sampling period to the total number of requests that came in for processing in this sampling period.

In accordance with an embodiment, as used herein, the terms "performance indicator," "performance metric" and/or "performance indicator/metric" are used interchangeably to refer to any metric characterizing the response time, throughput or load on hardware or software components in a system.

In accordance with an embodiment, as used herein, the term "bottleneck" is used to refer to any situation in which performance of a system is diminished or otherwise compromised due to the poor performance of one or more components. The component or components causing the bottleneck are referred to herein as "bottleneck components."

In accordance with an embodiment, as used herein, the term "model" is used to refer to a hierarchical representation of the relations between components within middleware systems. A model can include a static hierarchy of component types, which is predefined or predetermined during the design phase, and dynamic relations, which are established between component instances during runtime.

In accordance with an embodiment, as used herein, the term "problem tree" is used to refer to a runtime instance of a model, represented as a tree of related components that exhibit performance problems at runtime. The components in a problem tree may or may not be "effects" of one another.

In accordance with an embodiment, as used herein, the term "link probability" is used to refer to a measure of co-occurrence of performance problems within components, which are known to be related to each other, by virtue of their links in a problem tree.

In accordance with an embodiment, a method of determining a root cause of a performance problem is described. The method comprises analyzing a plurality of performance metrics in a first time period and determining that at least one performance metric is exhibiting abnormal behavior. The method further comprises analyzing the plurality of performance metrics over a second time period, wherein the second time period is longer than the first time period, and determining trend information for each performance metric over the second time period. The method further comprises correlating the trend information for each performance metric with performance problem information stored in a knowledge base, identifying a potential cause of the abnormal behavior based on the correlation, and alerting a user of the potential cause.

FIG. 1 illustrates a system, such as a middleware system, in accordance with an embodiment. As shown in FIG. 1, a typical middleware system 10 includes a plurality of resources, which in turn can be provided within containers 12, 14, such as Web Services or EJB containers, or as interfaces 15, such as a JDBC interface. A typical middleware system can also include a database 16, or provide access to one or more external databases. When a request 18 is received at the system, these resources are successively called or otherwise used 20, 21, to allow the system to eventually respond 24 to the request. Typically, individual resource usage information can be collected from the containers and interfaces by a plurality of agents 26, 28, 29 that are associated with the various containers and interfaces. The resource usage information or metrics 30 can be stored or otherwise provided to an enterprise manager repository 34. The information in the enterprise manager repository thus reflects an overview of metric information for the system over a relatively large period of time 36, and as such is useful for system monitoring by a system administrator 40. However, this form of metric information is of less use in identifying system problems when they occur.

Figure 2:
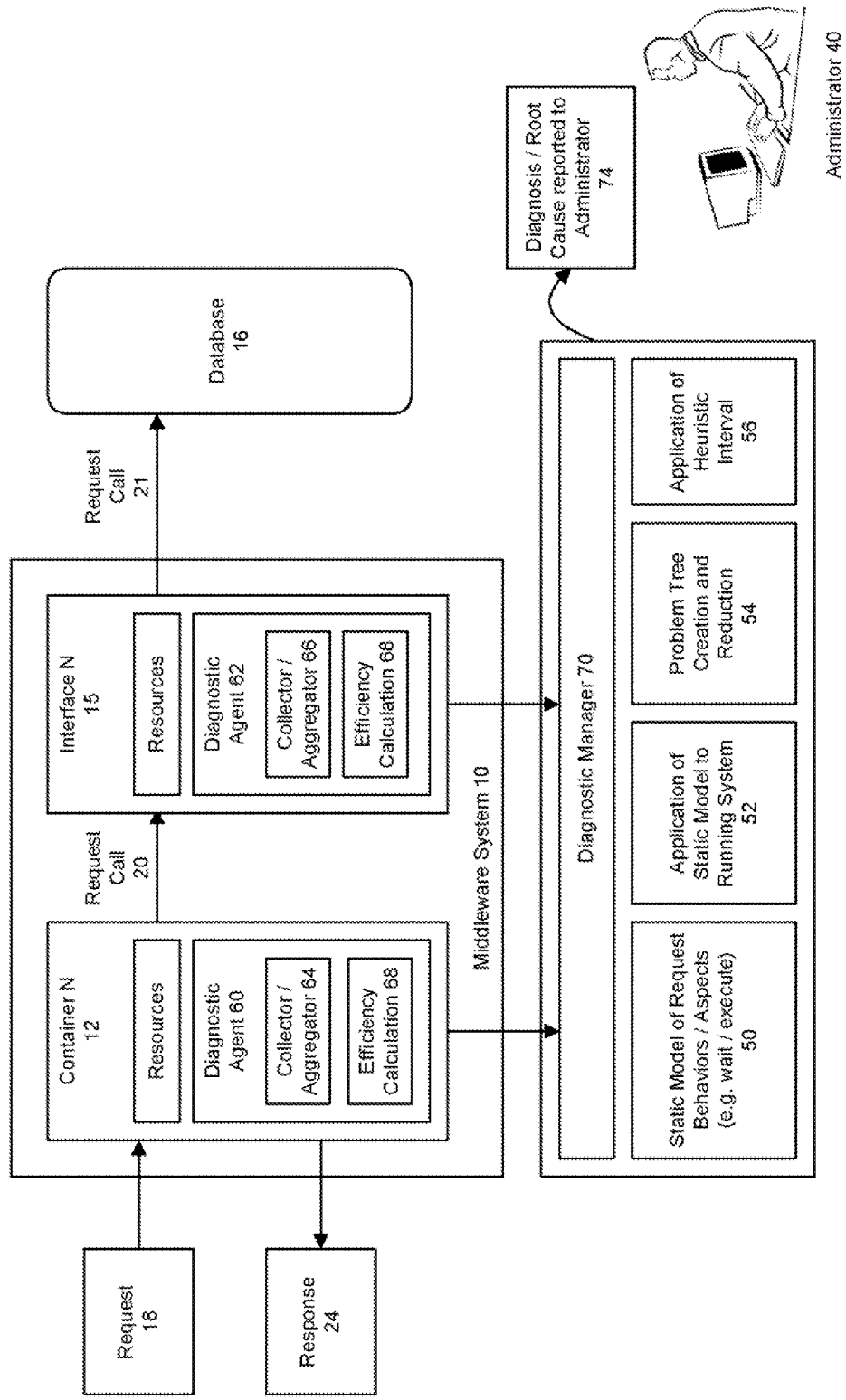
FIG. 2 illustrates a more detailed view of a system, such as a middleware system, that can be analyzed in accordance with an embodiment.

FIG. 2 illustrates a more detailed view of a system, such as a middleware system, in accordance with an embodiment. As shown in FIG. 2, the middleware system again includes a plurality of resources provided, e.g. as containers or interfaces, and again includes or provides access to one or more databases. In accordance with an embodiment, the system can allow definition of one or more of a static model of request behaviors 50, and allow application of the static model 52, to define behaviors within the current system configuration that are of most interest in problem identification (such as potential resource bottlenecks, or patterns of resource behavior that indicate potential problems). In accordance with an embodiment, a plurality of diagnostic agents 60, 62, coupled with collector/aggregators 64, 66, and a diagnostic manager 70, can provide information describing the runtime "efficiency" of a particular resource, within the context of this system. This information can then be used in combination with a problem tree 54, and heuristic interval 56, to provide diagnosis or the "root cause" 74 of a particular current system problem to the system administrator.

Figure 3:
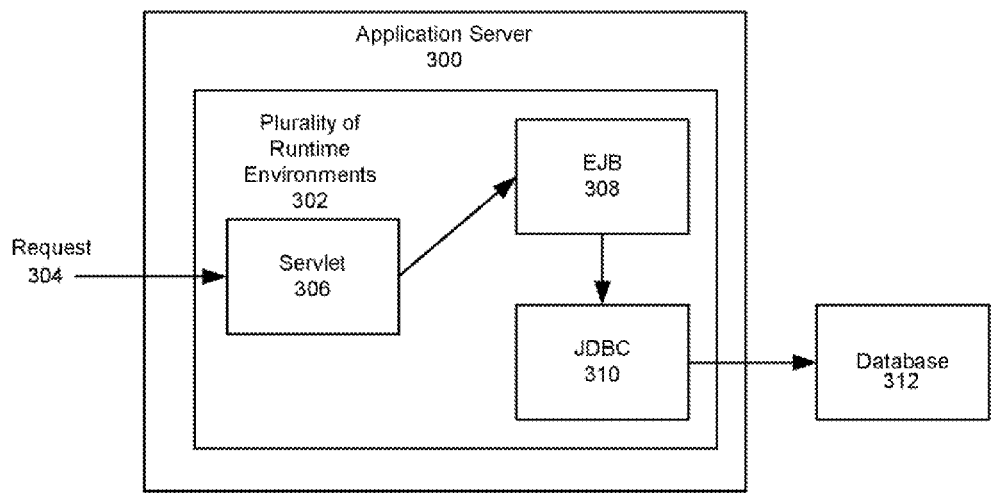
FIG. 3 shows an application server, in accordance with an embodiment.

FIG. 3 shows a particular example of a middleware system, such as those described in FIGS. 1 and 2, above. In accordance with an embodiment, an application server 300 can include a variety of runtime environments 302. These runtime environments can include EJB containers, servlet containers, Messaging Services, Web Service containers, Data source pools, Thread pools, and other runtime environments. Each runtime environment provides services such as transactions, security, and concurrency, for the application components deployed to the application server. Each of these runtime environments can have a number of configuration parameters that affect their performance. The performance of the middleware stack depends on the performance of each of these underlying containers.

A real world application using these runtime environments can become complex, making its administration equally complex. For example, as shown in FIG. 3, a request 304 can be received by a servlet container 306 which then invokes EJB container 308, which then invokes JDBC container 310 which accesses database 312. When a performance problem is encountered while serving the request, it may not be immediately clear which component is at fault. As such, diagnosing the root-cause when a performance problem occurs in such a complex environment therefore can be challenging.

In accordance with an embodiment, the performance of an application server can be evaluated using a plurality of performance metrics which can be defined in terms of response times, throughputs or load on hardware components, which can include computer processors, memory, disk I/O, and other well known hardware components. These performance metrics can vary, depending on the needs and capabilities of a particular system. For example, the performance metrics that are used can depend on the number of users, the size of typical requests that will be handled by the system and the amount of data processed; and can be tailored based on the available hardware, such as, but not limited to, CPU type, disk size, disk speed, and memory. The behavior of these performance metrics, can be used to determine the current performance state of the application server.

In accordance with an embodiment, the containers within an application server can similarly expose certain performance metrics, which can be used to determine the current performance state of those containers. Such runtime data from the containers may include performance metrics such as response time, load on the component, errors, and other metrics. These performance metrics indicate information, and their behavior can be tracked over time to provide additional trend information, which can be useful in detecting the root cause or causes behind a performance problem.

In accordance with an embodiment, an administrator can collect the performance metrics and define thresholds on these objectives to alert him or her of any abnormal behavior. However, in practice such alerts often notify the administrator of only the possibility of a problem. An abnormal behavior in a single performance metric, recorded in a limited time period, does not necessarily indicate an impact on the overall performance of the application server. Hence, once an alert is received the administrator needs to manually examine the information collected and, using his or her knowledge of the normal behavior of the system and what information is typically related to what problem, can then identify whether a problem exists in the system and then identify the problem and solution to that problem.

For example, any particular wait at a JDBC pool, or an increase in a heap usage, which is temporary does not necessarily indicate a problem. Such temporary performance issues can vary with the type of application written, the load on the system and other temporary or otherwise not systemically challenging factors. For example, a temporary spike in JDBC wait may occur due to various factors like stale connections, network being slow for a brief period, garbage collection in the container JVM, etc without necessarily impacting the overall performance.

However, if a particular component is contributing to a performance problem in the server, then abnormal behavior associated with that component can be indicative of a reason for the performance problem. For example, if JDBC is the component contributing to a performance problem in the server, a long wait in the JDBC pool can indicate that a potential cause of the performance problem is with the JDBC component. Therefore, although abnormal behavior in a particular component alone does not necessarily indicate a problem, if that component is already identified as a bottleneck component, then the abnormal behavior seen, indicated by the performance metric, strongly suggests that that component is the root-cause.

Figure 4:
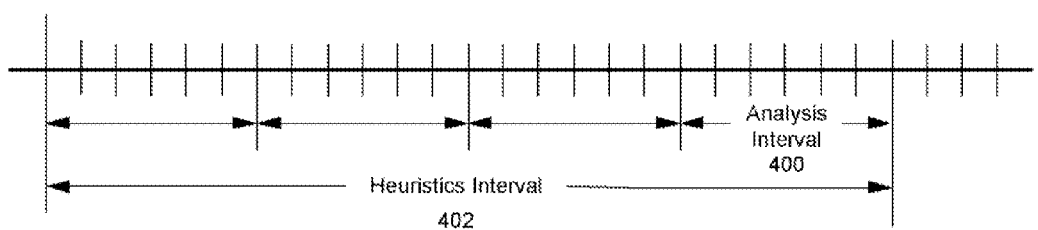
FIG. 4 shows a comparison of analysis periods, in accordance with an embodiment.

FIG. 4 shows a comparison of analysis periods, in accordance with an embodiment. In accordance with an embodiment, detection of problem components within an application server occurs during an analysis interval 400. An analysis interval is the time interval at which high fidelity, high frequency data is analyzed to detect problem components. The high frequency, high fidelity data can be collected during the occurrence of a problem, to detect bottleneck components. Problems can be detected by computing and analyzing efficiencies/inefficiencies on the high fidelity data.

In accordance with an embodiment, once these bottleneck components have been identified, trends in various performance metrics can be analyzed based on pre-determined patterns available within a knowledge base on the performance metrics collected for these bottleneck components. The trends can be determined over a heuristics interval 402. The heuristics interval is the time period over which the performance metric trends can be analyzed for a specific problem component to detect the root cause. In general, the heuristics interval is a relatively longer time period when compared to the analysis interval.

Typically, bottleneck conditions do not occur suddenly and instead are a manifestation of a gradually degrading component. This implies that for cause-determination, performance metrics must be analyzed over time to compute trends.

In accordance with an embodiment, when a problem is detected over a short interval, root cause identification is triggered which applies rules defined to the performance metrics' patterns which have been collected over a longer interval.

Figure 5:
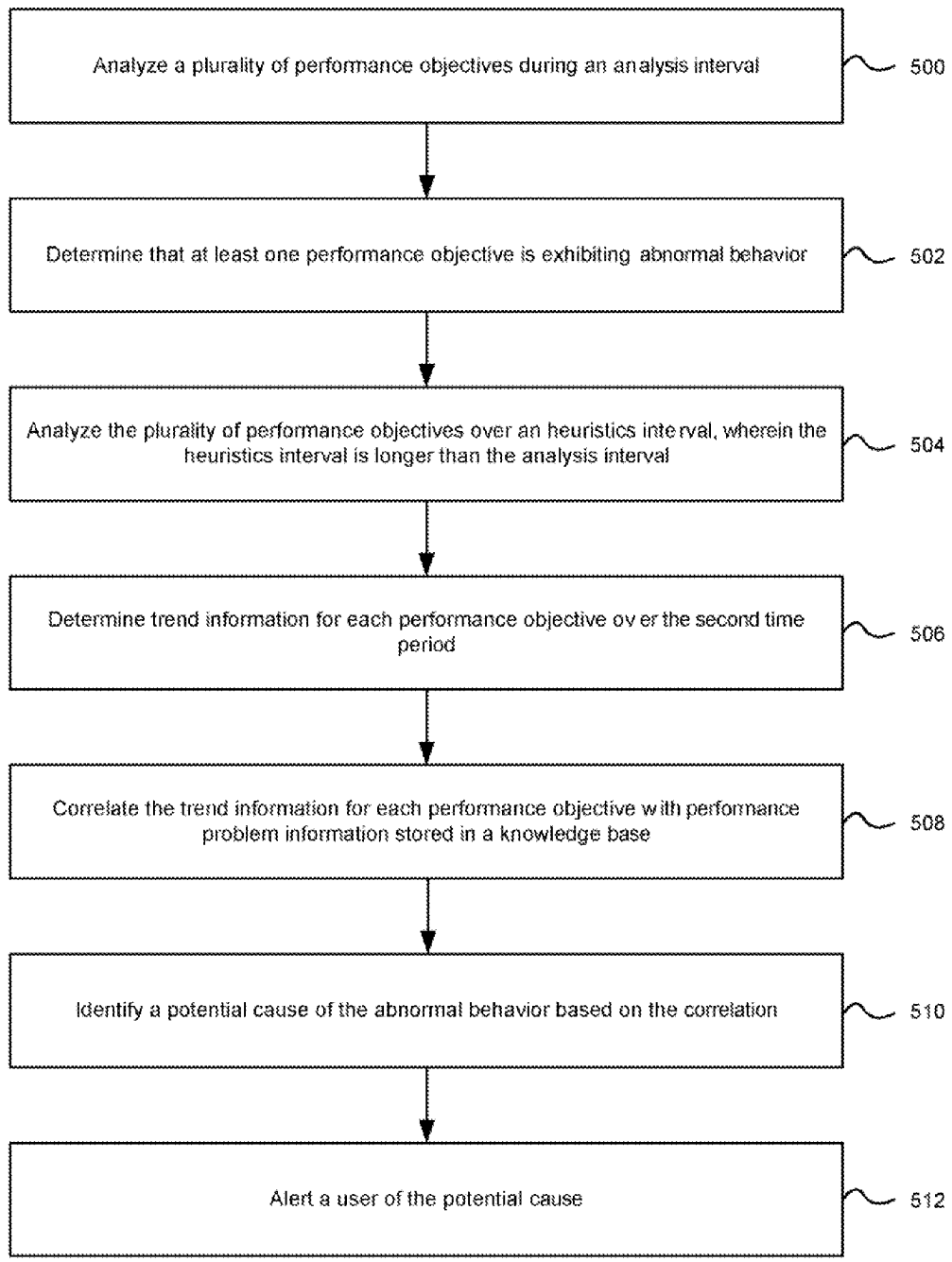
FIG. 5 shows a method of determining a root-cause of a performance problem, in accordance with an embodiment.

FIG. 5 shows a method of determining a root-cause of a performance problem, in accordance with an embodiment. At step 500, a plurality of performance metrics are analyzed in a first time period. The first time period can be the analysis interval shown at 400 in FIG. 4. At step 502, it is determined that at least one performance metric is exhibiting abnormal behavior. For example, a performance metric that indicates a wait time for a particular action could have exceeded a threshold value. The threshold value can be set by the administrator and can be based on the hardware components available in the system or other configuration details.

At step 504, after it is determined that abnormal behavior has occurred, the plurality of performance metrics are analyzed over a second time period, such as the heuristic interval 402, as shown in FIG. 4. In accordance with an embodiment, the second time period is longer than the first time period. At step 506, trend information is determined for each performance metric over the second time period.

At step 508, the trend information is correlated with performance problem information stored in a knowledge base. In accordance with an embodiment, common performance problems, which occur under different scenarios and across different application servers, can be grouped based on their root cause. Information about these common performance problems can be stored in a knowledge base and used to determine a root cause of a real world performance problem by comparing the symptoms of the performance problem (i.e., the abnormal behavior and the trend information). At step 510, based on the correlation of the trend information with the information stored in the knowledge base, a potential cause of the abnormal behavior is identified. At step 512, the user is alerted of the potential cause.

An analysis of various characteristics of different containers within an application server implies that performance problems within each container can be broadly attributed to one or more of the following:

Resource size-related constraints such as number of threads, pools, cache sizes that impact free flow of requests through the different layers in the server;

Capacity-related constraints on upper and lower limits such as heap sizes, memory, JMS quotas, etc;

Resource distribution related issues such as inconsistency in distribution of resources like work manager constraints, cluster load distribution, channel load distribution, distributed queues, etc; and External aspects such as a related server, LDAP, the host machine on which the application is deployed causing degradation in performance.

In accordance with an embodiment, the common constraints mentioned above, across various containers, exhibit similar behavior during performance problems. In accordance with an embodiment, these can be used to detect the various bottlenecks within a particular application server. A common unit of measure called efficiency of a component can be derived based on the performance metrics of the different aspects mentioned above. By evaluating and comparing the efficiencies of various components, the problem components within an application server can be identified.

The performance metrics associated with containers within an application server display discernable patterns and trends that indicate specific traits when a problem occurs. In accordance with an embodiment, by identifying metric statistics including rate, trend, rate to sum, residue, or count for a problem component, the cause of a problem can be ascertained. Based on domain knowledge, the behavioral patterns in the statistics computed for these metrics can be encoded as rules for determining causes in a problem component. These can then be defined in a knowledge base and evaluated at runtime for each problem component. This relationship between the known causes and the behavior of the associated metric statistics is called a diagnostic cause rule. Since these rules are based on the domain expertise, they are defined at design time. The diagnostic cause rules may involve both metric statistics as well as the related configuration of the component. As additional diagnostic cause rules are determined, the knowledge base can be updated accordingly.

In accordance with an embodiment, the diagnostic cause rules can require a different time interval from the problem detection stage called the heuristics interval, as described above in FIG. 4. The diagnostic cause rule execution can require evaluation of the various metric statistics and checking for predetermined patterns in the performance metric behavior over a period. The metric statistics, including average, rate, trend, ratio-to-report, residue, or count, are used in various diagnostic cause rules. To detect such statistics for performance metrics, an interval longer than the analysis interval can be required so that spikes and outliers are filtered away. Statistical functions such as average require only data to be considered where load is same as the analysis interval load, while functions such as residue require a longer interval to get a better picture. Hence, the heuristic interval is longer than the analysis interval and varies based on computed statistics for metrics.

In accordance with an embodiment, once the problem components are identified, various metric statistics of the components are evaluated based on the diagnostic cause rules that are defined for a component. Then the different diagnostic cause rules are executed at runtime to identify the possible root causes of a particular problem component.

Figure 6:
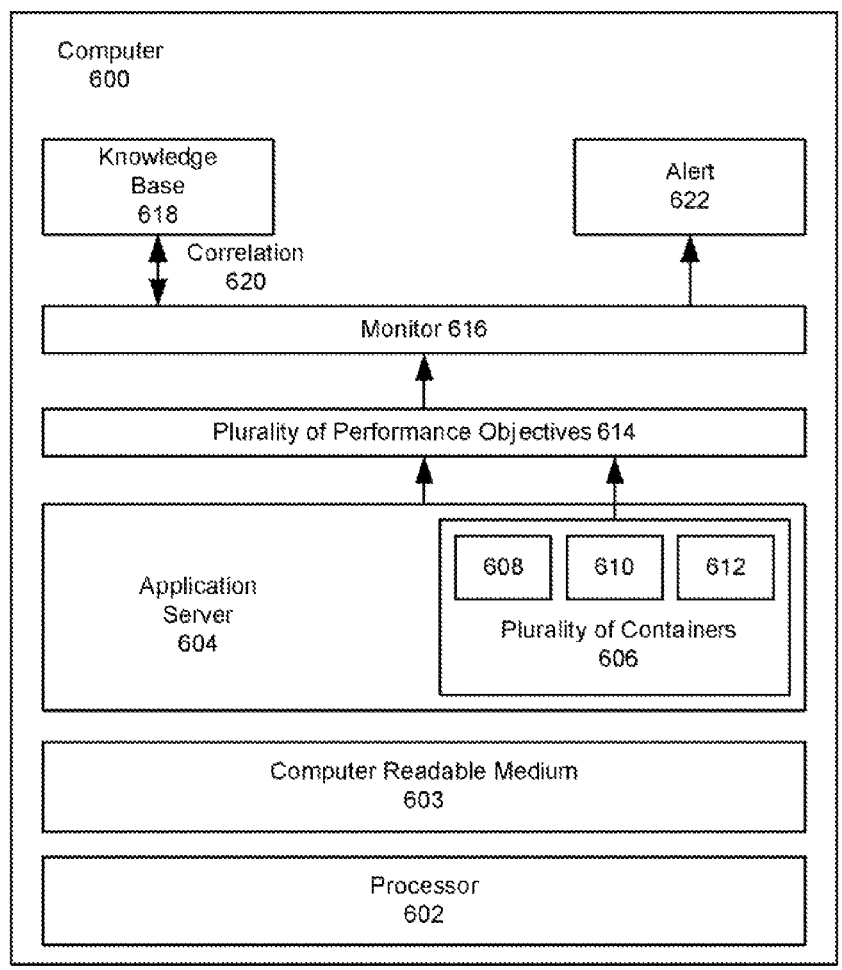
FIG. 6 shows a system for determining a root-cause of a performance problem, in accordance with an embodiment.

FIG. 6 shows a system for determining a root-cause of a performance problem, in accordance with an embodiment. As shown in FIG. 6, a computer 600, includes a computer readable medium 603 and processor 602 operating thereon. An application server 604 executes on the computer, and includes a plurality of runtime environments. These runtime environments are shown in FIG. 6 as a plurality of containers 606 including containers 608-612. These containers can include servlet containers, EJB containers, JDBC containers, and other containers and runtime environments as are generally known. Both the application server and the plurality of containers expose a plurality of performance metrics 614 which indicate the current performance of the application server. These performance metrics can be tracked by a monitor 616. The monitor can record the performance metrics so that the monitor can analyze their values over different time periods, such as the heuristics interval and the analysis interval. The monitor can also determine whether any of the performance metrics exhibits abnormal behavior over the first time period, and then determine trend information for each performance metric over the second time period. The monitor can correlate 620 the trend information for each performance metric with performance problem information stored in a knowledge base 618, and identify a potential cause of the abnormal behavior based on the correlation. The monitor can then alert 622 a user of the potential cause. The monitor is also operable to receive updates to the knowledge base which include additional diagnostic cause rules, and to update the knowledge base accordingly.

Figure 7:
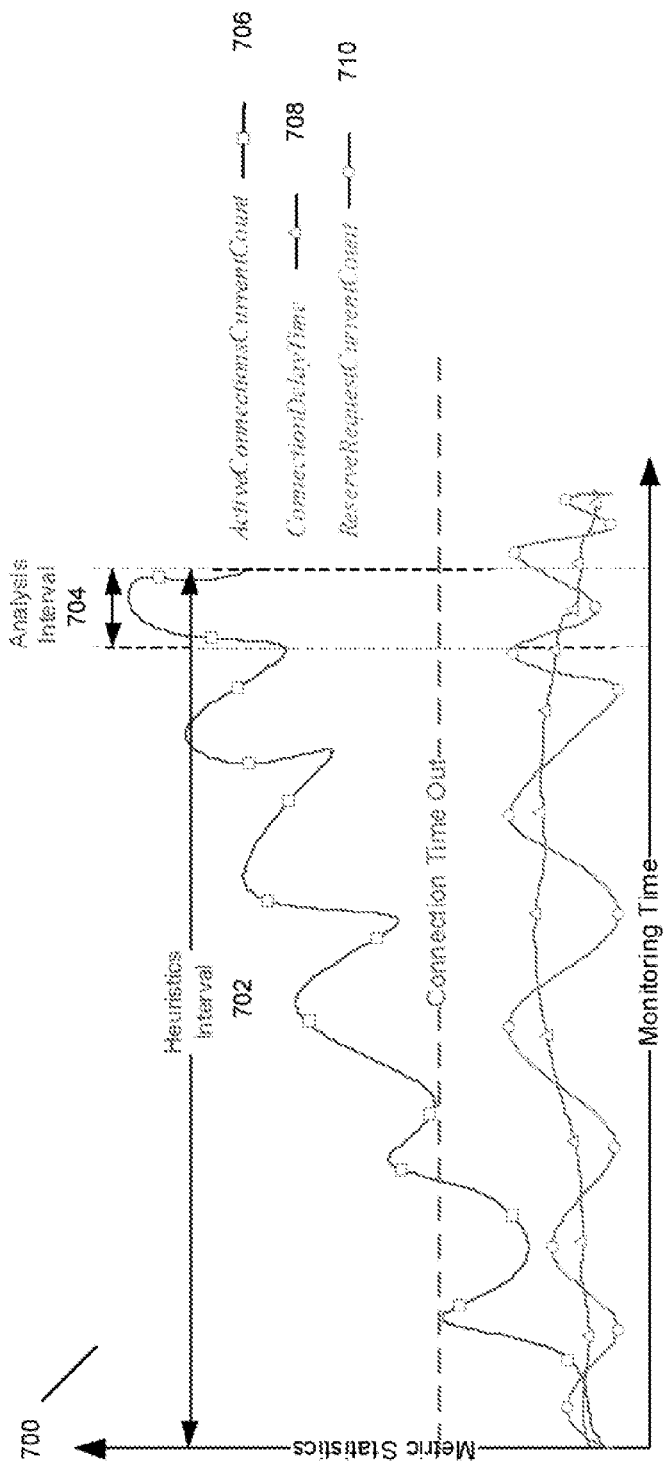
FIG. 7 shows an example of detection of a connection leak in a JDBC Data Source Component, in accordance with an embodiment.

FIG. 7 shows an example of detection of a connection leak in a JDBC Data Source Component, in accordance with an embodiment. In particular, FIG. 7 illustrates the diagnostic cause rule definition and cause detection using rules by considering the performance of a JDBC Data Source. This is not meant to indicate an exhaustive or exclusive list of diagnostic cause rules defined for a data source component. In accordance with an embodiment, high wait times in a JDBC data source can be attributed to connection pool leaks or low capacity of the connection pool.

In accordance with an embodiment, connection pool leaks occur when application code does not release a JDBC connection back to the connection pool after the database operation, resulting in a reduction in the effective pool size. When there is no net load on the connection pool, a residue in the ActiveConnectionsCurrentCount 706 metric indicates possible connection leaks in the application code. The net load on the connection pool will be a sum total of new load as well as retained load. The diagnostic cause rule for the performance problems due to connection pool leaks can be expressed as a condition to check if there is non-zero residual connection over the heuristic interval.

In accordance with an embodiment, there is low capacity for a connection pool when the wait time in a JDBC pool can be attributed to a small pool size, if the average wait ratio of a pool is high and if there are no residual connections.

FIG. 7 shows a chart 700 of several metric statistics over time, including ActiveConnectionsCurrentCount 706, ConnectionDelayTime 708 and ReserveRequestCurrentCount 710. These metric statistics are associated with wait times in JDBC Data Sources during a connection leak. From this, it can be seen that over a longer period of time, such as heuristics interval 702, performance metric ActiveConnectionsCurrentCount 706 exhibits an increasing trend, displaying a residual value. Hence, once a wait time in JDBC DataSource is established as a bottleneck or a problem node during a specific analysis interval, such as analysis interval 704, evaluation of various pre-defined diagnostic cause rules over a heuristic interval of time can be done to detect the root cause of a problem.

The present invention can be conveniently implemented using one or more conventional general purpose or specialized digital computer, computing device, machine, or microprocessor, including one or more processors, memory and/or non-transitory computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a computer readable storage medium (media) having instructions stored thereon/in which can be used to program a computer to perform any of the processes of the present invention. The computer readable storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method of determining a root cause of a performance problem, comprising:
   providing a set of diagnostic rules in a knowledge base, wherein said rules define relationships between a set of known causes and behavioral patterns in a plurality of performance metrics exposed by each of a plurality of components on an application server;
   analyzing each of the plurality of components to identify a plurality of common constraints contributing to performance problems of the plurality of components;
   deriving an efficiency measure for each component based on an additional plurality of performance metrics describing the plurality of common constraints;
   identifying a problem component by evaluating and comparing the efficiency measure for each component over a first time period, wherein the problem component exposes at least one performance metric that has violated a pre-determined threshold;
   analyzing each of the performance metrics exposed by the problem component over a second time period, which is longer than the first time period, to identify a performance metric that displays an increasing or decreasing trend in values recorded for the performance metric over the second time period; and
   executing the diagnostic rules to detect a behavioral pattern that matches the trend to identify a potential cause of the problem component.

2. The method claim 1, wherein the application server exposes a different plurality of performance metrics.

3. The method of claim 1, wherein the pre-determined threshold is modifiable by an administrator.

4. The method claim 1, further comprising:
   updating the knowledge base to include information related to additional known causes.

5. The method of claim 1, further comprising:
   alerting a user of the potential cause.

6. The method of claim 1, wherein the plurality of performance metrics exposed by each of the plurality of components include response times, throughputs or load on hardware components.

7. The method of claim 1, wherein the common constraints include one or more of:
   a number of threads,
   a number of pools,
   cache size, and
   upper and lower limits on heap sizes, memory and Java Message Service (JMS) quotas.

8. A system for determining a root cause of a performance problem, comprising:
   a computer, including a processor;
   an application server, executing on the computer, that includes a plurality of components, wherein each component exposes a plurality of performance metrics;
   a set of diagnostic rules in a knowledge base, wherein said rules define relationships between a set of known causes and behavioral patterns in the plurality of performance metrics exposed by each component;
   a monitor, wherein the monitor operates to
      analyze each of the plurality of components to identify a plurality of common constraints contributing to performance problems of the plurality of components,
      derive an efficiency measure for each component based on an additional plurality of performance metrics describing the plurality of common constraints,
      identify a problem component by evaluating and comparing the efficiency measure for each component over a first time period, wherein the problem component exposes at least one performance metric that has violated a pre-determined threshold,
   analyze each of the performance metrics exposed by the problem component over a second time period, wherein the second time period is longer than the first time period, to identify a performance metric that displays an increasing or decreasing trend in values recorded for the performance metric over the second time period, and
   execute the diagnostic rules to detect a said behavioral pattern that matches the trend to identify a potential cause of the problem component.

9. The system of claim 8, wherein the application server exposes a different plurality of performance metrics.

10. The system of claim 8, wherein the pre-determined threshold is modifiable by an administrator.

11. The system of claim 8, wherein the monitor is further operable to:
    receive an update to the knowledge base to include information related to additional potential causes; and
    update the knowledge base accordingly.

12. The system of claim 8, wherein the monitor is further operable to:
    alert a user of the potential cause.

13. The system of claim 8, wherein the plurality of performance metrics exposed by each of the plurality of components include response times, throughputs or load on hardware components.

14. The system of claim 8, wherein the common constraints include one or more of the following:
    a number of threads,
    a number of pools,
    cache size, and
    upper and lower limits on heap sizes, memory and Java Message Service (JMS) quotas.

15. A non-transitory computer readable storage medium including instructions stored thereon which, when executed by a computer, cause the computer to perform the steps comprising:
    providing a set of diagnostic rules in a knowledge base, wherein said rules define relationships between a set of known causes and behavioral patterns in a plurality of performance metrics exposed by each of a plurality of components on an application server;
    analyzing each of the plurality of components to identify a plurality of common constraints contributing to performance problems of the plurality of components;
    deriving an efficiency measure for each component based on an additional plurality of performance metrics describing the plurality of common constraints;

identifying a problem component by evaluating and comparing the efficiency measure for each component over a first time period, wherein the problem component exposes at least one performance metric that has violated a pre-determined threshold;

analyzing each of the performance metrics exposed by the problem component over a second time period, which is longer than the first time period, to identify a performance metric that displays an increasing or decreasing trend in values recorded for the performance metric over the second time period; and executing the diagnostic rules to detect a behavioral pattern that matches the trend to identify a potential cause of the problem component.

16. The non-transitory computer readable storage medium of claim 15, wherein the application server exposes a different plurality of performance metrics.

17. The non-transitory computer readable storage medium of claim 15, the pre-determined threshold is modifiable by an administrator.

18. The non-transitory computer readable storage medium of claim 15, further comprising:

updating the knowledge base to include information related to additional potential causes.

19. The non-transitory computer readable storage medium of claim 15, further comprising:

alerting a user of the potential cause.

20. The non-transitory computer readable storage medium of claim 15, wherein the plurality of performance metrics exposed by each of the plurality of components include response times, throughputs or load on hardware components.

* * * * *

UNITED STATES PATENT AND TRADEMARK OFFICE
CERTIFICATE OF CORRECTION

| | |
|---|---|
| PATENT NO. | : 8,892,960 B2 |
| APPLICATION NO. | : 13/009775 |
| DATED | : November 18, 2014 |
| INVENTOR(S) | : Sambamurthy et al. |

It is certified that error appears in the above-identified patent and that said Letters Patent is hereby corrected as shown below:

IN THE CLAIMS:

In column 9, line 45, in Claim 2, after "method" insert -- of --.

In column 9, line 49, in Claim 4, after "method" insert -- of --.

Signed and Sealed this
Twenty-third Day of June, 2015

Michelle K. Lee
*Director of the United States Patent and Trademark Office*